Dec. 16, 1952    F. S. LOMBARDI    2,621,615
METHOD OF AND APPARATUS FOR MANUFACTURING COILED EDIBLE PASTES
Filed Aug. 27, 1949    4 Sheets-Sheet 1
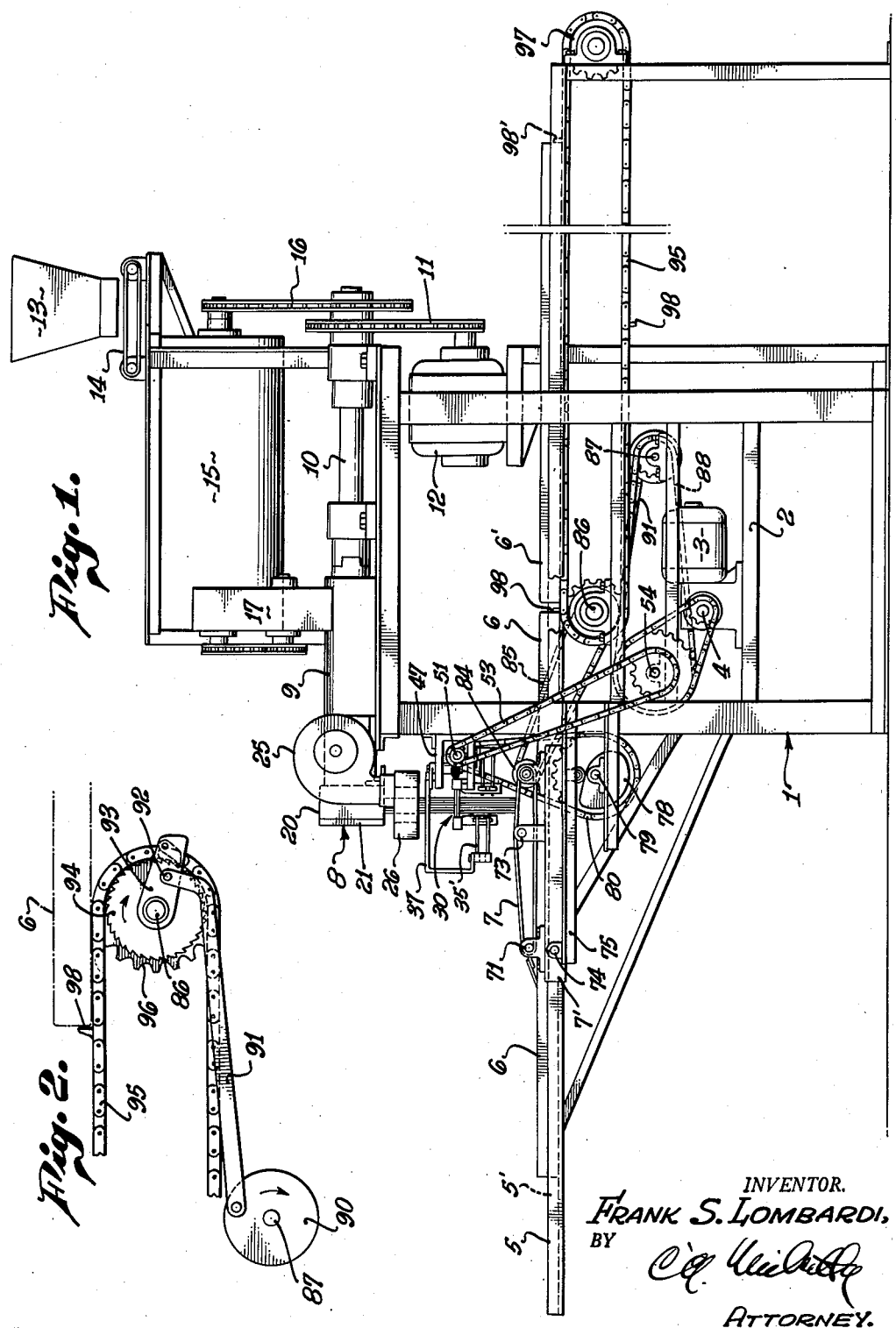
INVENTOR.
FRANK S. LOMBARDI,
BY
ATTORNEY.

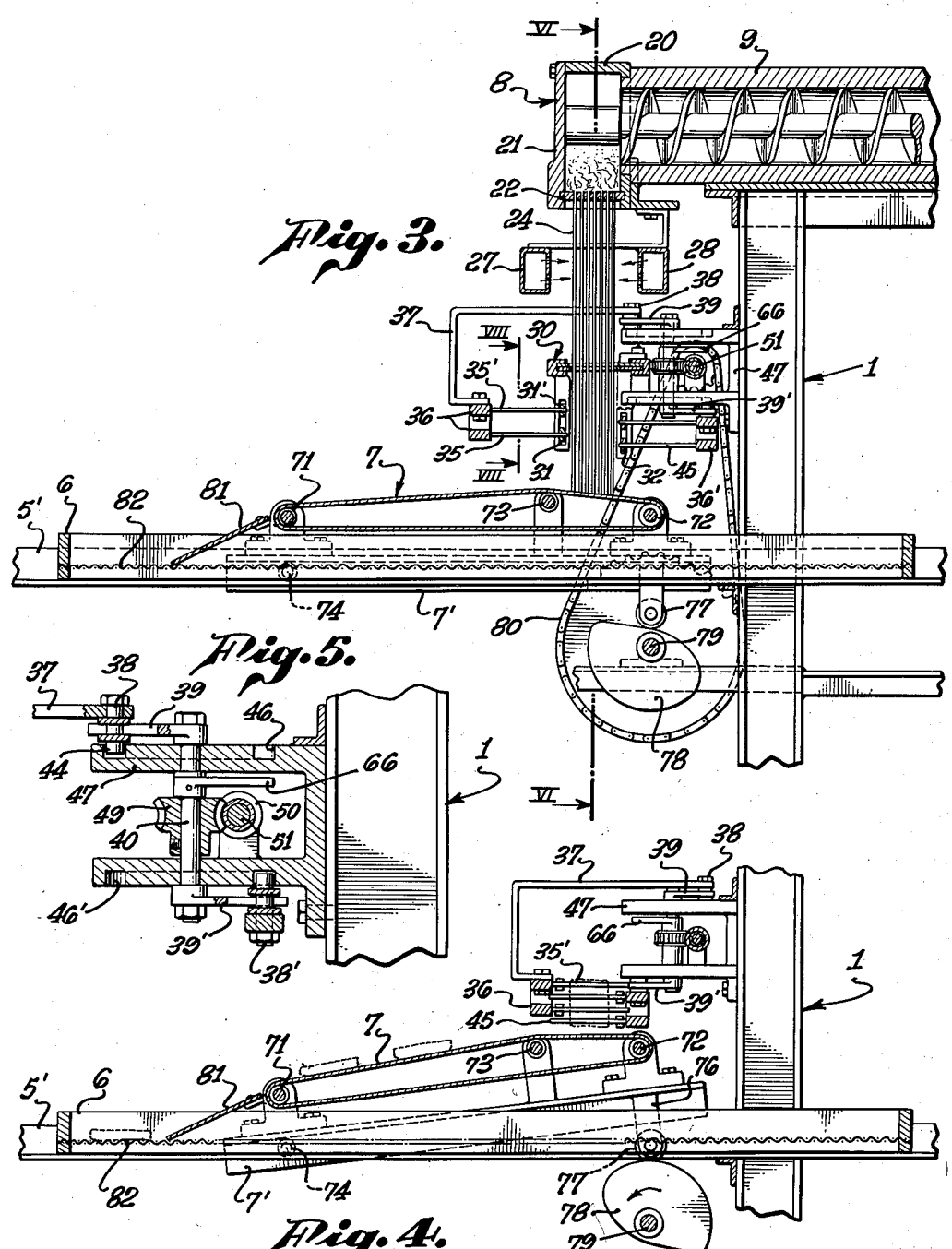

Dec. 16, 1952        F. S. LOMBARDI        2,621,615

METHOD OF AND APPARATUS FOR MANUFACTURING COILED EDIBLE PASTES

Filed Aug. 27, 1949        4 Sheets-Sheet 3

INVENTOR.
FRANK S. LOMBARDI,
BY
ATTORNEY.

Dec. 16, 1952           F. S. LOMBARDI           2,621,615
METHOD OF AND APPARATUS FOR MANUFACTURING COILED EDIBLE PASTES
Filed Aug. 27, 1949           4 Sheets-Sheet 4
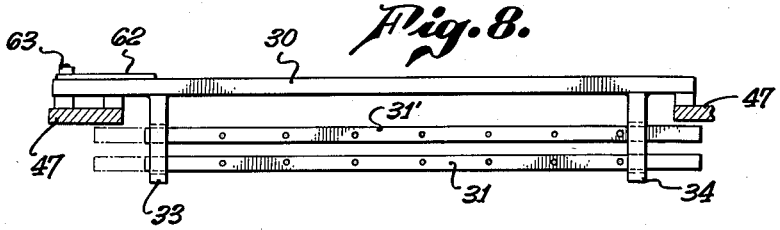
   
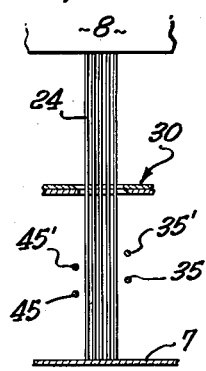 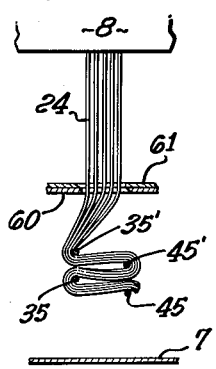 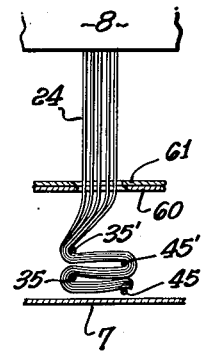 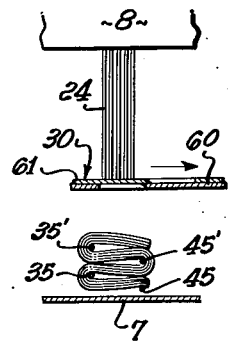
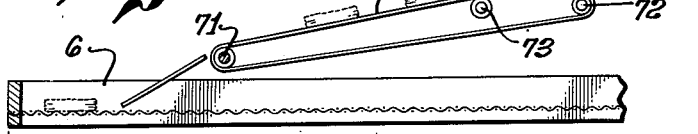
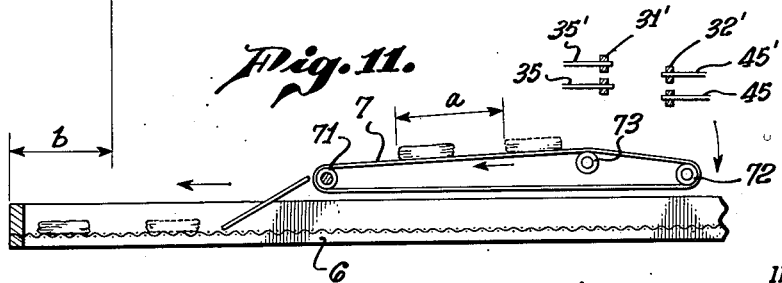
  
INVENTOR.
FRANK S. LOMBARDI,
BY
ATTORNEY.

Patented Dec. 16, 1952

2,621,615

UNITED STATES PATENT OFFICE 2,621,615

METHOD OF AND APPARATUS FOR MANUFACTURING COILED EDIBLE PASTES

Frank S. Lombardi, North Hollywood, Calif.

Application August 27, 1949, Serial No. 112,692

8 Claims. (Cl. 107—54)

The present invention pertains to means and methods whereby edible pastes, such as vermicelli, spaghetti, tagliarini, and other string-like pastes may be efficiently manufactured in a sanitary manner. Although the means and methods of the invention may be carried out in various ways for the production of a number of species of edible pastes, the invention is of particular utility when applied to the manufacture of what is known as coiled vermicelli or spaghetti.

Various edible pastes are made from suitable stiff doughs by extrusion through dies, the configuration of the die imparting a characteristic appearance to the resulting foodstuff. Spaghetti, macaroni, vermicelli, lasagna, and other varieties of edible pastes differ in cross-sectional size and contour, but all of them are made in substantially the same manner. One of the popular forms of paste consists of a plurality of string-like pastes coiled into a pat, the coiling causing the string-like paste to assume a zig-zag or figure 8 configuration in the pat.

Heretofore, coiled vermicelli (which is one of the characteristic forms of paste referred to hereinabove) involved extensive hand labor, bundles of vermicelli being coiled by hand into the desired pat. Many disadvantages are inherent in this manual operation. In the first place, the operation is not entirely sanitary and requires manual manipulation of the many strands of vermicelli. Secondly, the pats are not of uniform size or weight. As a result, when the pats are packaged and it is desirable that each package contain a predetermined weight of product, it has been found necessary to often break a pat into two or three pieces in order to make sure that the package assumes the desired predetermined weight. As a result, the customer always received a broken pat or just a part of a pat in addition to the complete coils and the manufacturer was subjected to the added labor costs incidental to individual weighings of the packages and the materials' cost incidental to the destruction of many pats or coils, the necessity of disposing of many broken pieces and the useless expenditure of time in operating without the production of complete, salable articles in many instances.

The present machine obviates all of these difficulties and permits the manufacture of coiled vermicelli, each coil being of a predetermined weight and the coils being uniform as to size and shape. Since the coils are of a predetermined and virtually constant weight, a given number of such coils will always produce a complete package of a desired weight and it is not necessary to use portions of coils to make up weight. The operation, moreover, is entirely mechanical, eliminating manual handling, and not only is a greater quantity of finished product manufactured per hour with a greatly reduced labor force, but the product itself is more salable and uniform.

It is to be remembered that all edible pastes of the character hereinbefore mentioned are dried before being packaged. The machine of this invention not only forms the coils but automatically places them upon drying trays which can be moved into a drier in an automatic manner, further eliminating handling and thereby insuring freedom from contamination.

Generally stated, the method of the present invention comprises extruding a number of bundles of strands of paste simultaneously in a continuous manner, subjecting them to the action of drying air to surface-dry each of said strands, automatically coiling a predetermined length of each bundle so as to simultaneously form a plurality of coils and automatically placing the coils thus formed upon an intermittently advancing drying tray. As a result, uniform coils are placed in proper spaced relation upon a drying tray and such drying tray may then be moved or carried into a drier for final curing.

The machine of the present invention is not only capable of accomplishing the steps hereinbefore described, but is also adapted to produce other edible paste products. By changing the die used in the extrusion head of the machine and by regulating the operation of the cutting knives, coiling fingers, transfer conveyor, etc., coils of different shape and size may be manufactured at will. By eliminating a coiling finger, predetermined lengths of spaghetti and other pastes can be made.

It is an object of the present invention, therefore, to disclose and provide a method of manufacturing edible pastes in strand form in an automatic manner, whereby contact with the hands of operators is eliminated and a more uniform and sterile product is obtained.

Another object of the invention is to disclose and provide a machine for automatically coiling vermicelli and other string-like pastes.

A still further object of the invention is to disclosed and provide a machine capable of producing coiled vermicelli and the like in a sanitary manner, all of the coils being substantially uniform in contour and weight.

These and other objects and advantages of the invention will become apparent to those skilled in the art from the following description of one embodiment of the invention. In such description reference will be had to the appended drawings, in which:

Fig. 1 is a side elevation of a machine embodying the present invention.

Fig. 2 is an enlarged fragmentary side view, partly diagrammatic, illustrating means for intermittently advancing the drying trays.

Fig. 3 is an enlarged vertical section taken longitudinally through the head of the machine.

Fig. 4 is a fragmentary, longitudinal section through the head of the machine illustrating a final position in a series of operations.

Fig. 5 is an enlarged vertical section of a portion of the knife-actuating and coiling finger-actuating mechanism shown in side elevation in Fig. 4.

Fig. 8 is a front view, partly in section, taken along the plane VIII—VIII in Fig. 3.

Figure 6:
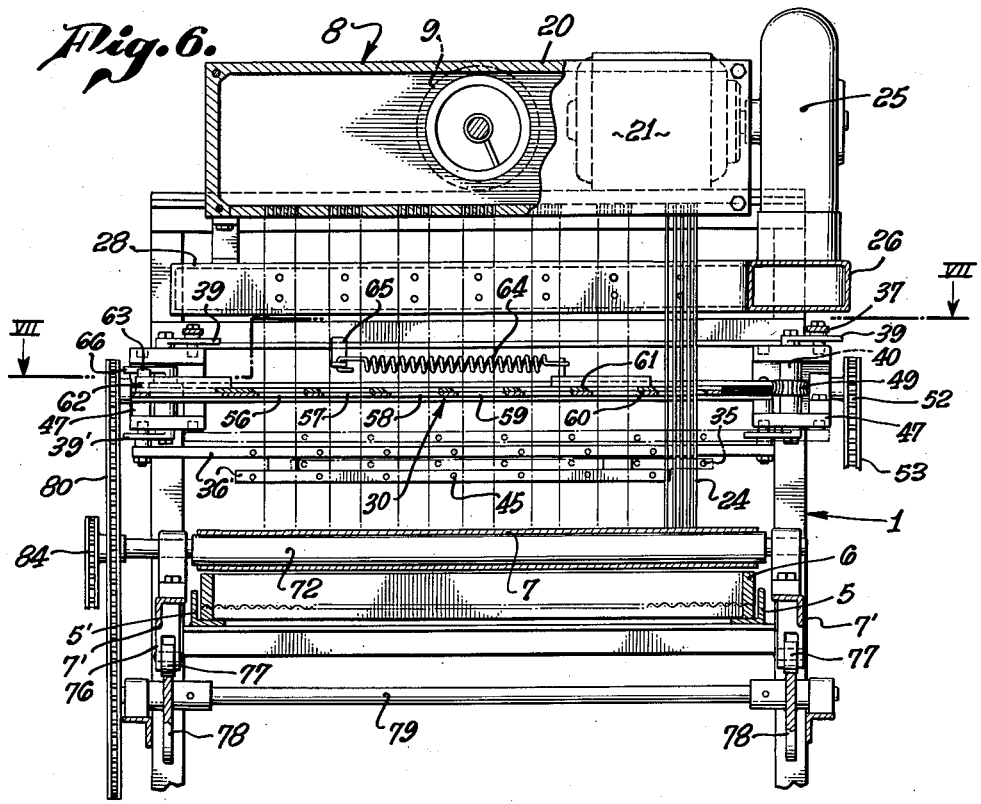
Fig. 6 is a vertical section, partly in elevation, taken along the plane VI—VI in Fig. 3.

Figs. 9, 9a, 9b and 9c diagrammatically represent successive positions assumed by certain of the parts during the formation of a coil.

Figs. 10 and 11 are diagrammatic representations of two successive positions assumed by the transfer conveyor.

Fig. 12 is a perspective view of a coil of vermicelli automatically manufactured by the machine.

The machine may comprise a suitable base frame 1 having a lower platform 2 supporting a motor 3 and an associated gear case from which extends the drive shaft 4. At a somewhat higher level there are provided longitudinally extending, spaced, horizontal, parallel trackways or guides 5 and 5' upon which drying trays (frames provided with a foraminous or screen-like bottom) such as 6 and 6' are intermittently advanced. Immediately above the plane of movement of the drying trays is an intermittently operated transfer conveyor 7, one portion of such conveyor extending beneath a die head 8 through which the paste is extruded. The die head is supplied with a suitable mixed dough from an auger chamber 9 (see Figs. 1 and 3), such auger chamber including a screw conveyor driven by shaft 10 and a suitable sprocket chain drive or other driving connection 11 from a motor 12 carried upon a bracket above the plane of travel of the drying trays.

Flour or other ingredients required to make the dough may be supplied from suitable hoppers or bins 13 onto a feeding mechanism 14 which feeds the dough mixer 15. The dough mixer may be driven from the shaft 10 by a chain or belt 16. The dough mixer 15 discharges its contents through an auxiliary mixer or feeder 17 into one end of the auger chamber 9, the auger forcing the paste into the die head 8. Those skilled in the art will readily appreciate that various methods and mechanisms for properly feeding the ingredients into a dough mixer, various types of dough mixers and various types of drives can be used in mixing dough and supplying the same to a die head and no claims of invention are made to these specific elements.

The die head 8 may assume a variety of forms, but, as shown, may include a main housing 20 provided with a removable front plate 21, said front plate including a journal for the forward end of the screw conveyor which rotates within the feeding chamber 9. The bottom of the die head 8 is provided with a removable die 22. Die 22 is provided with groups of ports or perforations through which the paste is extruded. Seven such groups of perforations are indicated in Fig. 6, although it is to be understood that a larger or smaller number of groups may be employed, depending upon the capacity of the dough mixer and the character of the paste product being made. The number of perforations or ports in each group may vary appreciably. When coiled vermicelli is being manufactured, from 30 to 60 ports may be used in each group, resulting in 30 to 60 separate strands of vermicelli in each finished coil thereof. It is to be understood that the interior of the head 8 may be provided with suitable distributing vanes for the purpose of uniformly supplying paste from the auger chamber 9 to each of the groups of ports in the die 22.

It will be observed that the die 22 is in a substantially horizontal plane so as to permit the strands of vermicelli to be discharged downwardly and hang by gravity, as indicated at 24 in Figs. 3 and 6.

In order to prevent the strands of vermicelli from sticking to each other unnecessarily, means are provided for subjecting the freshly extruded vermicelli to a surface or skin drying. Such means may comprise a motor-driven fan 25 carried by the base frame of the machine, such fan discharging into a manifold 26 having branches 27 and 28 extending transversely of the machine immediately below the die 22. These branch lines 27 and 28 are provided with a plurality of opposing air ports (indicated in Fig. 3) which direct the air supplied to the manifold by the fan 25 against the descending strands of vermicelli.

As the strands of vermicelli of each group descend they pass through openings in a knife assembly, generally indicated at 30, which is supported by brackets 47 hereinafter described, and then downwardly between stripping and supporting plates 31 and 32 through which coiling fingers are adapted to move, and then onto the transfer conveyor 7.

Operation of coiling fingers

The stripping and supporting bars 31 and 32 mentioned hereinabove are mounted for slidable movement transversely of the machine and as indicated in Fig. 8 may slide through slots formed in downwardly extending members 33 and 34 carried by the knife assembly 30. It will be noted that the front of the machine is provided with two stripping bars 31 and 31'; one or more stripping bars may be used, depending upon the number of convolutions to be imparted to the vermicelli. Each of the stripping bars 31 and 31' is provided with a plurality of apertures adapted to slidably receive the coiling fingers or pins 35 and 35'. These coiling fingers are carried by a support 36 carried by the lower end of brackets 37 each pivotally connected to a stud pin 38 (see Figs. 3, 4 and 5). The stud pins 38 extend through a slot formed in crank arms 39 carried by the upper end of stub shafts 40. A similar crank arm 39' is carried by the lower end of each stub shaft 40 and operates opposing coiling fingers extending forwardly from the supporting member 36', and this supporting member is supported in part by crank arms 39' and stud pins 38' and in part by coaction of fingers 45 with bar 32. A description of the means for operating coiling fingers 35 and 35' will be sufficient, since the fingers 45 and 45' carried by the rear member 36' are driven in the same manner with only a difference in phase and direction.

By referring to Figs. 9, 9a, 9b and 9c the operation of the fingers 35 and 45 will become apparent. The operation of the fingers will be best understood by conceiving that the tip of each finger moves along an oval path in a horizontal plane, said path including the area through which the bundle of strands of vermicelli passes. The fingers 45 and 45' therefore move longitudinally of the machine into position alongside the bundle of vermicelli 24, as indicated in Fig. 9, and then move transversely into the position indicated in Fig. 9a and then move longitudinally toward the rear of the machine. During such movements the fingers 35 and 35' first move longitudinally into position adjacent the bundle of vermicelli, then transversely into the position indicated in Fig. 9a and then longitudinally toward the front of the machine. During the last-mentioned movements of the fingers (wherein the fingers 35 move toward the front of the machine and the fingers 45 move toward the rear of the machine) said fingers are retracted through the respective stripper and support plates 31, 31' and 32, 32' into the position indicated in Fig. 10, permitting the now coiled bundle or pat of vermicelli to be dropped upon the transfer conveyor 7, since the bundle has been cut by the knife assembly 30 shortly before the coiling fingers were withdrawn.

In order to impart the oval traverse to the respective fingers 35, 35' the lower portion of stud pin 38 (Fig. 5) is provided with a roller 44 which is slidably received in an oval camway or trackway 46 formed in the upper surface of each bracket 47 in which stub shaft 40 is journaled. The corresponding arm 39' carrying stud pin 38' is also provided with a roller end riding within an oval camway 46' formed in the lower face of bracket 47. It will be noted, however, that the arms 39 and 39' are oppositely directed. Rotation of shaft 40 will therefore impart opposite movements to the supports 36 and 36' which are connected to the respective stud pins 38 and 38'.

Each of the stub shafts 40 is provided with a worm wheel 49 in engagement with the worm 50 mounted upon a shaft 51 suitably journaled and provided with the sprocket 52. The shaft 51 is driven by suitable means such as the chain 53 from a countershaft 54 (see Fig. 1), the shaft 54 being driven in turn by the drive shaft 4.

Knife-actuating mechanism

Figure 7:
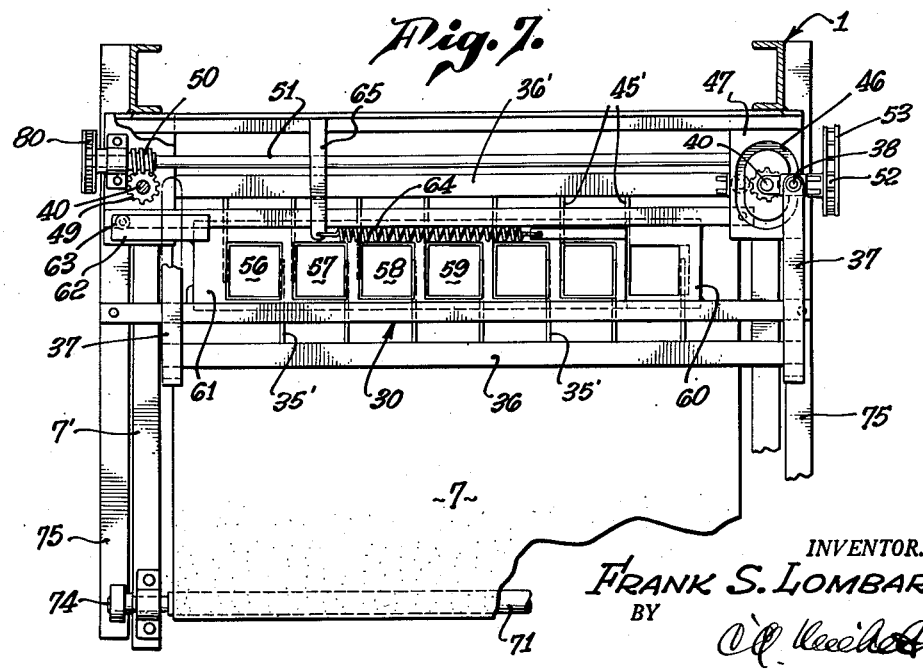
Fig. 7 is a horizontal section taken along the plane VII—VII in Fig. 6.

The cutter head assembly, generally indicated at 30, comprises a horizontally disposed frame including a lower stationary knife or series of knives 60 and an upper knife plate 61. The knives 60 and 61 may be in the form of steel plates each provided with a squared aperture such as the apertures 56, 57, 58 and 59 (Fig. 7) through which the bundles of vermicelli may extend. The edges of these apertures are sharpened as best illustrated in Figs. 9-9c. Upper plate 61 is provided on each end thereof with an extension arm 62 having an upwardly extending contact roller 63. This upper knife plate 61 is spring-biased so as to normally maintain its ports or openings in alignment with the ports or openings in the lower knife plate 60. A biasing spring 64 having one end connected to the upper movable knife plate 61 and the other to a fixed abutment 65, insures the above-mentioned alignment of ports.

One of the stub shafts 40 also carries an actuating arm 66 (see Fig. 5) and during the rotation of the stub shaft 40 said arm 66 intermittently and periodically contacts the roller 63 on arm 62 carried by knife plate 61, causing said knife plate 61 to move against the action of spring 64 to the right, as indicated in Figs. 9-9c, thereby cutting off the bundles of vermicelli extending through the various openings 56—59. As soon as arm 66 loses contact with roller 63, the biasing spring 64 returns the knife assembly to its original position permitting the constantly descending bundles of vermicelli to again pass through the knife assembly.

In the illustrated example, the knife assembly has been shown as composed of two plates, each provided with an opening, the edges of such plates adjacent such openings being sharpened so as to act as knives. It will also be understood that by properly positioning the arm 66 on stub shaft 40 (with respect to the position of arms 39 and 39' and the location of roller 63) the cutting-off operation may be suitably timed with respect to the coiling operation previously described. These matters of adjustment are left to the skill of the mechanic and operator.

Transfer conveyor

The transfer conveyor 7 is a continuous, belt-type conveyor mounted upon rollers 71, 72 and 73, these rollers being suitably journaled in pillow blocks connected to a frame 7', the forward end of such frame being pivotally connected as at 74 to the main frame 1 or an extension thereof indicated at 75. In order to prevent the flexible, slightly moist, coiled vermicelli from falling any appreciable distance from the coiling fingers onto a non-yielding surface and thereby becoming compacted, means are provided whereby the transfer conveyor 7 rises in timed relation to the coiling and cutting-off operations, so as to meet the freshly made coils. This is accomplished by providing the pivotal frame 7' with a downwardly extending bracket 76 provided with a roller 77 adapted to ride upon a cam 78 mounted on shaft 79 (see Figs. 3 and 4). Shaft 79 is driven through suitable sprockets and a chain 80 from shaft 51. Since shaft 51 controls the cutting-off and coiling devices, its speed controls the movements of cam 78 and the rise and fall of frame 7' upon which conveyor 7 is mounted. When in the lowermost position (Fig. 3) the strands of vermicelli extend below the coiling fingers. When the coiling fingers have been actuated, the transfer conveyor is raised into the position indicated in Fig. 4 so that when the coiling fingers are withdrawn from the coils the coiled pat of vermicelli is deposited onto the conveyor 7 without being compacted, whereupon the transfer conveyor 7 is lowered and simultaneously advanced so as to move the coil of vermicelli toward a flexible apron 81 and deposit same upon the foraminous bottom 82 of a tray 6.

Transfer conveyor 7 is intermittently driven as follows. Roller 72 is provided with a shaft bearing a sprocket 84, this sprocket being connected by a flexible chain drive 85 with a sprocket mounted on a transversely extending shaft 86 (see Fig. 1). Shaft 86 is intermittently driven as follows. A countershaft 87 is continuously driven by chain 88 from a sprocket on countershaft 54. The end of shaft 87 carries a disc or crank arm 90

(see Fig. 2). The crank or disc 90 is provided with a connecting rod 91 pivotally connected as at 92 to a pawl arm 93 loosely journaled on shaft 86 adjacent a ratchet wheel 94 mounted on said shaft 86. Continuous rotation of shaft 87 is therefore translated into an intermittent, unidirectional rotation of shaft 86. Such intermittent rotation is transmitted by chain 85 to the transfer conveyor 7. Simultaneously shaft 86 imparts intermittent movement to the drying trays 6 and 6'. This is accomplished by one or more chains 95 in engagement with sprockets 96 mounted upon shaft 86, these chains passing over a freely journaled sprocket 97 journaled in the rear end of the machine. The chains 95 are provided with dogs 98 and 98' adapted to abut the rear ends of drying trays 6 and 6'. It will be therefore evident that whenever the transfer conveyor 7 is lowered and intermittently driven, the tray 6 is also driven forwardly a predetermined amount and as a result the series of coils of vermicelli which have just been coiled by the fingers are deposited upon the tray in spaced relation to a preceding series of coils, as illustrated in Figs. 10 and 11. The spacing of the coils on the transfer conveyor 7 (indicated at *a* in Fig. 11) may be equal to the spacing of the coils on the drying tray (indicated at *b*), or by suitable change in sprocket ratios conveyor 7 may be cleared every time a series of coils is deposited thereon, the increment of travel in this case of the conveyor 7 being materially greater than the length of travel of the drying tray in the interval.

From the description given hereinabove, it will be noted that a number of operations take place in timed relation. Pressure feed of paste into the die head may be continuous and the extrusion of vermicelli may also be continuous. However, the following operations take place in sequence: (1) the coiling pins are operated; (2) the transfer conveyor is raised; (3) the bundles of vermicelli paste are cut; (4) the coiling pins are withdrawn; (5) the transfer conveyor is lowered and advanced and the drying tray is moved.

It will be noted that all of these operations take place automatically without the necessity of having workers handle the paste. The operation is conducted without contact with humans.

It is to be remembered that although two pairs of coiling fingers have been illustrated, the invention is not limited thereto. A suitable product can be made by using pins such as 35, 45 and 45' without the use of coiling fingers 35'. By changing the arrangement of ports in the die head, the number of individual strands in a bundle, the number of folds imparted thereto, etc., may be controlled and various configurations may be imparted to the coils. By regulating the speed at which the paste is extruded, other changes in the weight and contour of the finished coil may be attained. The shape of the oval camway 46 will also influence the shape of the coil. The desires of the purchasing public as to the shape, size and weight of the finished coil of vermicelli or spaghetti can be readily satisfied by minor changes in the controlling elements hereinabove referred to.

Moreover, those skilled in the art will readily appreciate that the machine is capable of producing a large tonnage of product with much greater uniformity than has been heretofore attained.

All changes and modifications coming within the scope of the appended claims are embraced thereby.

I claim:

1. In an automatic machine for coiling vermicelli and other string-like edible pastes, the combination of: means for continuously and downwardly extruding a group of strands of edible paste; a pair of coiling fingers, each movable in a plane transverse to said group of strands, the plane of movement of one coiling finger being displaced vertically with respect to the plane of movement of the other finger; means for moving said fingers transversely from beyond one side of said group to the other side of said group simultaneously but in opposite directions and then laterally out of contact with the group of strands; means for severing said group of strands in a zone between said coiling fingers and extruding means; and means for actuating said severing means in timed relation to the movement of said coiling fingers.

2. In an apparatus of the character stated in claim 1 the provision of means, cooperating with said coiling fingers, for restraining lateral movement of strands of edible paste during lateral movement of the coiling fingers.

3. In an apparatus for coiling groups of string-like edible pastes, the combination of: means for continuously extruding a group of separate strands of edible paste in close proximity to each other; a pair of coiling fingers, each movable along a path in a plane transverse to the axis of said group of strands of paste, said path of movement extending from beyond one side of said group of strands to beyond the other side of said group, the path of movement of one of said fingers being in a plane displaced along the axis of the group from the plane of the path of movement of the other of said fingers; means for severing said group of extruded strands; and means for actuating said severing means in timed relation to the movement of said coiling fingers.

4. In an apparatus of the character stated in claim 3 the provision of means, positioned between said extruding means and severing means, for directing a blast of air upon the freshly extruded strands.

5. In an automatic machine for coiling vermicelli and other string-like edible pastes, the combination of: means for continuously and downwardly extruding a group of strands of edible paste; transversely movable stripping members positioned in front and in back of a group of strands extruded by said extruding means, said stripping members movable in vertically displaced planes with respect to each other; a laterally movable coiling finger slidably extending through each of said stripping members; and means for moving said coiling fingers transversely from beyond one side of said group to the other side of said group simultaneously but in opposite directions to coil a freshly extruded group of strands and for moving said fingers laterally in opposite directions out of contact with the coiled strands.

6. In an apparatus of the character stated in claim 5 the provision of means for severing the group of strands in a zone between the coiling fingers and extruding means.

7. In an apparatus of the character stated in claim 5 the provision of means for severing said group of strands in a zone between the coiling fingers and extruding means and a single driving means for actuating the severing means in timed relation to the movement of the coiling fingers.

8. A method of automatically making coiled vermicelli and the like which comprises: continuously extruding a group of strands of vermicelli; passing coiling fingers transversely through said group of strands in spaced planes simultaneously and in opposite directions; severing the group of strands thus coiled; and withdrawing the coiling fingers laterally from the coiled vermicelli while restraining the coiled vermicelli against lateral movement.

FRANK S. LOMBARDI.

REFERENCES CITED

The following references are of record in the file of this patent:

UNITED STATES PATENTS

| Number | Name | Date |
| --- | --- | --- |
| 945,222 | Chong | Jan. 4, 1910 |
| 1,145,874 | Amouroux | July 13, 1915 |
| 1,373,293 | Boehm | Mar. 29, 1921 |
| 1,566,705 | Tanzi | Dec. 22, 1925 |
| 1,844,152 | Funck | Feb. 9, 1932 |
| 1,985,574 | Mariani | Dec. 25, 1934 |
| 2,234,526 | Guldbech | Mar. 11, 1941 |

FOREIGN PATENTS

| Number | Country | Date |
| --- | --- | --- |
| 479,776 | Germany | July 22, 1929 |